US011574067B2

(12) United States Patent
Epasto et al.

(10) Patent No.: US 11,574,067 B2
(45) Date of Patent: Feb. 7, 2023

(54) EFFICIENT ON-DEVICE PUBLIC-PRIVATE COMPUTATION

(71) Applicant: Google LLC, Mountain View, CA (US)

(72) Inventors: Alessandro Epasto, New York, NY (US); Vahab Seyed Mirrokni, Hoboken, NJ (US); Hossein Esfandiari, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 462 days.

(21) Appl. No.: 16/774,380

(22) Filed: Jan. 28, 2020

(65) Prior Publication Data

US 2020/0242268 A1    Jul. 30, 2020

Related U.S. Application Data

(60) Provisional application No. 62/797,651, filed on Jan. 28, 2019.

(51) Int. Cl.
*G06F 21/62* (2013.01)
*G06F 16/21* (2019.01)
*G06N 5/04* (2006.01)
*G06F 16/28* (2019.01)

(52) U.S. Cl.
CPC ........ *G06F 21/6218* (2013.01); *G06F 16/212* (2019.01); *G06F 16/285* (2019.01); *G06F 16/288* (2019.01); *G06N 5/04* (2013.01)

(58) Field of Classification Search
None
See application file for complete search history.

(56) References Cited

U.S. PATENT DOCUMENTS

| 11,100,600 B2* | 8/2021 | Shaw | G06F 21/60 |
|---|---|---|---|
| 2017/0249434 A1* | 8/2017 | Brunner | G06F 16/258 |
| 2020/0020062 A1* | 1/2020 | Shaw | G06Q 20/40 |
| 2020/0242268 A1* | 7/2020 | Epasto | G06N 5/04 |
| 2022/0129766 A1* | 4/2022 | Potts | G16H 70/20 |
| 2022/0188661 A1* | 6/2022 | Tappin | G06F 16/248 |

OTHER PUBLICATIONS

Abadi et al., "Deep Learning with Differential Privacy", arXiv:1607.00133v2, Oct. 24, 2016, 14 pages.
(Continued)

*Primary Examiner* — Kim T Nguyen
(74) *Attorney, Agent, or Firm* — Dority & Manning, P.A.

(57) ABSTRACT

Example systems and methods enhance user privacy by performing efficient on-device public-private computation on a combination of public and private data, such as, for example, public and private graph data. In particular, the on-device public-private computation framework described herein can enable a device associated with an entity to efficiently compute a combined output that takes into account and is explicitly based upon a combination of data that is associated with the entity and data that is associated with one or more other entities that are private connections of the entity, all without revealing to a centralized computing system a set of locally stored private data that identifies the one or more other entities that are private connections of the entity.

19 Claims, 6 Drawing Sheets

(56) References Cited

OTHER PUBLICATIONS

Agarwal et al., "Approximating Extent Measures of Points", Journal of the ACM, vol. 51, No. 4, Jul. 2004, 30 pages.
Agarwal et al., "Mergeable Summaries", 2012 ACM SIGMOD/PODS, May 21-23, 2012, Scottsdale, AZ, 12 pages.
Ahmadian et al., "Better Guarantees for k-Means and Euclidean k-Medianby Prima-Dual Algorithms", Foundations of Computer Science (FOCS 2017), Oct. 15-17, 2017, Berkeley, CA, 12 pages.
Ahn et al., "Analyzing Graph Structure via Linear Measurements", ACM-SIAM Symposium on Discrete Algorithms, Jan. 17-19, 2012, Kyoto, Japan, pp. 459-467.
Ahn et al., "Graph Sketches: Sparsification, Spanners, and Subgraphs", ACM SIGMOD-SIGACT-SIGAI Symposium on Principles of Database Systems, May 20-24, 2012, Scottsdale, AZ, 9 pages.
Archer et al., "Indexing Public-Private Graphs", 26th International Conference on World Wide Web, Apr. 3-7, 2017, Perth, Australia, 10 pages.
Backstrom et al., "Four Degrees of Separation", 4th Annual ACM Web Science Conference (WebSci '12), Jun. 22-24, 2012, Evanston, IL, 10 pages.
Backstrom et al., "Wherefore Art Thou R3579x? Anonymized Social Networks, Hidden Patterns, and Structural Stenography", 16th International World Wide Web Conference, May 8-12, 2007, Banff, Alberta, Canada, 10 pages.
Bansal et al., "Correlation Clustering", Machine Learning, vol. 56, 2004, pp. 89-113.
Bateni et al., "Distributed Balanced Clustering Via Mapping Coresets" Twenty-eighth Conference on Neural Information Processing Systems, Dec. 8-13, 2014, Montreal, Canada, 9 pages.
Blum et al., "Practical Privacy: the SuLQ framework" 24th ACM SIGMOD-SIGACT-SIGART Symposium of Principles of Database Systems, Jun. 13-15, 2005, Baltimore, MD, 11 pages.
Bobadilla et al., "Recommender Systems Survey", Knowledge-Based Systems, vol. 46, 2013, pp. 109-132.
Boldi et al., "HyperANF: Approximating the Neighbourhood Function of Very Large Graphs on a Budget", 20th International World Wide Web Conference, Mar. 28, 2011-Apr. 1, 2011, Hyderabad, India, pp. 625-634.
Bonawitz et al., "Practical Secure Aggregation for Privacy-Preserving Machine Learning", 2017 ACM SIGSAC Conference on Computer and Communications Security, Oct. 30, 2017-Nov. 3, 2017, Dallas, TX, pp. 1175-1191.
Chierichetti et al., "Efficient Algorithms for Public-Private Social Networks", 21st ACM SIGKDD Conference on Knowledge Discovery and Data Mining, Oct. 10-13, 2015, Sydney, Australia, 10 pages.
Cho et al, "Friendship and Mobility: User Movement in Location-Based Social Networks", 17th ACM SIGKDD International Conference on Knowledge Discovery and Data Mining, Aug. 21-24, 2011, San Diego, CA, 9 pages.
Cohen, "All-Distances Sketches, Revisited: HIP Estimators for Massive Graphs Analysis", 2014 ACM SIGMOD/PODS Conference, Jun. 22-27, 2017, Snowbird, Utah, 15 pages.
Cohen, "Size-Estimation Framework with Applications to Transitive Closure Reachability", Journal of Computer and System Sciences, vol. 55, 1997, pp. 441-453.
Demetrescu et al., "A New Approach to Dynamic All Pairs Shortest Paths", Journal of the ACM, vol. 51, No. 6, 2004, pp. 159-166.
Dey et al., "Facebook Users Have Become Much More Private: A Large-Scale Study", 2012 IEEE International Conference on Persuasive Computing and Communications Workshops (PerCom Workshops), Mar. 19-23, 2012, Lugano, Switzerland, 7 pages.
Dinur et al., "Revealing Information While Preserving Privacy", SIGMOD/PODS03: International Conference on Management of Data and Symposium on Principles Database and Systems, Jun. 9-12, 2003, San Diego, pp. 202-210.
Dwork et al., "Calibrating Noise to Sensitivity in Private Data Analysis", 3rd Theory of Cryptography Conference, vol. 3876 LNCS, 2006, pp. 265-284.

Dwork et al., "Privacy-Preserving Datamining on Vertically Partitioned Databases", Advances in Cryptology—CRYPTO 2004, LNCS, vol. 3152, 2004, pp. 528-544.
Dwork et al., "The Algorithmic Foundations of Differential Privacy", Foundations and Trends in Theoretical Computer Science, vol. 9, Nos. 3-4, 2014, 281 pages.
Erlingsson et al., "RAPPOR: Randomized Aggregatable Privacy-Preserving Ordinal Response", 21st ACM Conference on Computer and Communications Security, Nov. 3-7, 2014, Scottsdale, AZ, 14 pages.
Fogaras et al., "Towards Scaling Fully Personalized PageRank: Algorithms, Lower Bounds, and Experiments", Internet Mathematics, vol. 2, No. 3, 2005, pp. 333-358.
Garcia, "Leaking Privacy and Shadow Profiles in Online Social Networks", Science Advances, vol. 3, No. 8, Aug. 4, 2017, 6 pages.
Gross et al., "Information Revelation and Privacy in Online Social Networks", 2005 ACM Workshop on Privacy in the Electronic Society, Nov. 7, 2005, Alexandria Virginia, 10 pages.
Indyk et al., "Composable Core-sets for Diversity and Coverage Maximization", 2014 ACM SIGMOD/PODS Conference, Jun. 22-27, 2017, Snowbird, Utah, pp. 100-108.
Jain, "Data clustering: 50 years beyond K-means", Pattern Recognition Letters, vol. 31, No. 8, 2010, pp. 651-666.
Jowhari et al., "Tight Bounds for LP Samplers, Finding Duplicates in Streams, and Related Problems", thirtieth ACM SIGMOD-SIGACT-SIGART symposium on Principles of database systems, Jun. 12-16, 2011, Athens, Greece, 10 pages.
Kalyanasundaram et al., "The Probabilistic Communication Complexity of Set Intersection", Siam Journal on Discrete Mathematics, vol. 5, No. 4, Nov. 1992, pp. 545-557.
Kremer et al., "On Randomized One-Round Communication Complexity", Computational Complexity, vol. 8, No. 1, 1999, 21-49 An extended abstract of this work appeared in the proceedings of STOC 1995.
Larsen et al., "Heavy hitters via cluster-preserving clustering", arXiv:1604.01357v1, Apr. 5, 2016, 39 pages.
Leskovec et al,. "Graphs over Time: Densification Laws, Shrinking Diameters and Possible Explanations", KDD05: The Eleventh ACM SIGKDD International Conference on Knowledge Discovery and Data Mining, Aug. 21-24, 2005, Chicago, Illinois, 11 pages.
McAuley et al., "From Amateurs to Connoisseurs: Modeling the Evolution of User Expertise through Online Reviews", 22nd International World Wide Web Conference, May 13-17, 2013, Rio de Janeiro, Brazil, 11 pages.
McGregor et al., "A Simple, Space-Efficient, Streaming Algorithm for Matchings in Low Arboricity Graphs", 1st Symposium on Simplicity in Algorithms (SOSA 2018), Oasics, vol. 61, 2018, pp. 14.1-14.4.
McGregor, "Graph Stream Algorithms: A Survey", SIGMOD Record, vol. 43, No. 1, Mar. 2014, pp. 9-20.
McMahan et al., "Communication-Efficient Learning of Deep Networks from Decentralized Data", 20th International Conference on Artificial Intelligence and Statistics, Apr. 20-22, 2017, Ft. Lauderdale, FL, 10 pages.
Mirzasoleiman et al., "Fast Distributed Submodular Cover: Public-Private Data Summarization", Thirtieth Conference on Neural Information Processing Systems, Dec. 5-10, 2016, Barcelona, Spain, 9 pages.
Palmer et al., "ANF: A Fast and Scalable Tool for Data Mining in Massive Graphs", ACM SIGKDD International Conference on Knowledge Discovery and Data Mining, Jul. 23-26, 2002, Edmonton, Canada, 10 pages.
Panigrahy et al., "How User Behavior is Related to Social Affinity", Fifth ACM International Conference on Web Search and Data Mining, Feb. 8-12, 2012, Seattle, WA, 10 Pages.
Park et al., "Location-Based Recommendation System Using Bayesian User's Preference Model in Mobile Devices", 4th International Conference, UIC 2007, Jul. 11-13, 2007, Hong Kong, China, pp. 1130-1139.
Qin et al., "Heavy Hitter Estimation over Set-Valued Data with Local Differential Privacy", 23rd ACM Conference on Computer and Communications Security, Oct. 24-28, 2016, Vienna, Austria, 12 pages.

(56) References Cited

OTHER PUBLICATIONS

Razborov, "On the distributional complexity of disjointness", Theoretical Computer Science, vol. 106, No. 2, 1992, pp. 385-390.
Sarma et al., "A Sketch-Based Distance Oracle for Web-Scale Graphs", Third ACM International Conference on Web Search and Data Mining, Feb. 3-6, 2010, New York City, New York, pp. 401-410.
Silva et al., "Data Stream Clustering: A Survey", ACM Computing Surveys, vol. 46, No. 1, Oct. 2013, 37 pages.
Walter et al., "A model of a trust-based recommendation system on a social network", Autonomous Agents and Multi-Agent Systems, vol. 16, No. 1, 2008, pp. 57-74.
Yu et al., "My Friend Leaks My Privacy: Modeling and Analyzing Privacy in Social Networks", ACM Symposium on Access Control Models and Technologies (SACMAT), Jun. 13-15, 2018, Indianapolis, Indiana, pp. 93-104.
Zheleva et al,. "To Join or Not to Join: The Illusion of Privacy in Social Networks with Mixed Public and Private User Profiles", The 18$^{th}$ International World Wide Web Conference, Apr. 20-24, 2009, Madrid, Spain, 10 pages.

\* cited by examiner

EFFICIENT ON-DEVICE PUBLIC-PRIVATE COMPUTATION

RELATED APPLICATIONS

This application claims priority to and the benefit of U.S. Provisional Patent Application No. 62/797,651, filed Jan. 28, 2019. U.S. Provisional Patent Application No. 62/797,651 is hereby incorporated by reference in its entirety.

FIELD

The present disclosure relates generally to techniques for computing outputs over a combination of public and private data. More particularly, the present disclosure relates to systems and methods that perform efficient on-device public-private computation, such as, for example, on a combination of public and private graph data.

BACKGROUND

Digital devices play a significant role in the lives of their users through the connections they provide, the information they allow to consume, and the online purchases made with them. The wealth of information on such devices (contacts, purchases, etc.) can be potentially used to provide the owner of the device with ever improved services and a better user experience. However, respecting the privacy of the user is essential. As such, providing users with useful services while also respecting their privacy is an ongoing challenge in the fields of data mining and machine learning and a fundamental endeavor in the research community and in the industry.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system includes a central computing system configured to perform a first set of operations. The first set of operations include storing a set of public data, wherein a plurality of subsets of the public data are respectively associated with a plurality of entities. The first set of operations include, for each of the plurality of entities: processing the respective subset of the public data associated with the entity to produce a respective output for the entity and transmitting data descriptive of the respective output for the entity to one or more entity computing devices associated with the entity. The computing system includes a plurality of entity computing devices respectively associated with the plurality of entities, wherein at least one of the entity computing devices is configured to perform a second set of operations. The second set of operations include storing a set of private data that describes one or more connections between a corresponding entity of the plurality of entities and one or more connected entities of the plurality of entities. The second set of operations include receiving the respective output associated with the corresponding entity from the central computing system. The second set of operations include communicating with at least one other entity computing device associated with at least one connected entity of the one or more connected entities to receive from the at least one other entity computing device at least one additional output that is associated with the at least one connected entity of the one or more connected entities. The second set of operations include determining a combined output based at least in part on a combination of the respective output associated with the corresponding entity and received from the central computing system with the at least one additional output associated with the at least one connected entity.

Another example aspect of the present disclosure is directed to a computer-implemented method. The method includes storing, by an entity computing device associated with a corresponding entity of a plurality of entities, a set of private data that describes one or more connections between the corresponding entity and one or more connected entities of the plurality of entities. The method includes receiving, by the entity computing device from a central computing system, a respective output associated with the corresponding entity. The respective output is a result of the central computing system processing a respective subset of a set of public data stored at the central computing system, wherein the respective subset of the set of public data is associated with the corresponding entity. The method includes communicating, by the entity computing device, with at least one other entity computing device associated with at least one connected entity of the one or more connected entities to receive from the at least one other entity computing device at least one additional output that is associated with the at least one connected entity of the one or more connected entities. The at least one additional output was received by the at least one other entity computing device from the central computing system. The at least one additional output is a result of the central computing system processing at least one additional subset of the set of public data stored at the central computing system. The at least one additional subset of the set of public data is associated with the at least one connected entity. The method includes determining, by the entity computing device, a combined output based at least in part on a combination of the respective output associated with the corresponding entity and received from the central computing system with the at least one additional output associated with the at least one connected entity.

Another example aspect of the present disclosure is directed to a computer-implemented method. The method includes storing a set of public data, wherein a plurality of subsets of the public data are respectively associated with a plurality of entities. The method includes, for each of the plurality of entities: processing the respective subset of the public data associated with the entity to produce a respective output for the entity and transmitting data descriptive of the respective output for the entity to one or more entity computing devices associated with the entity.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
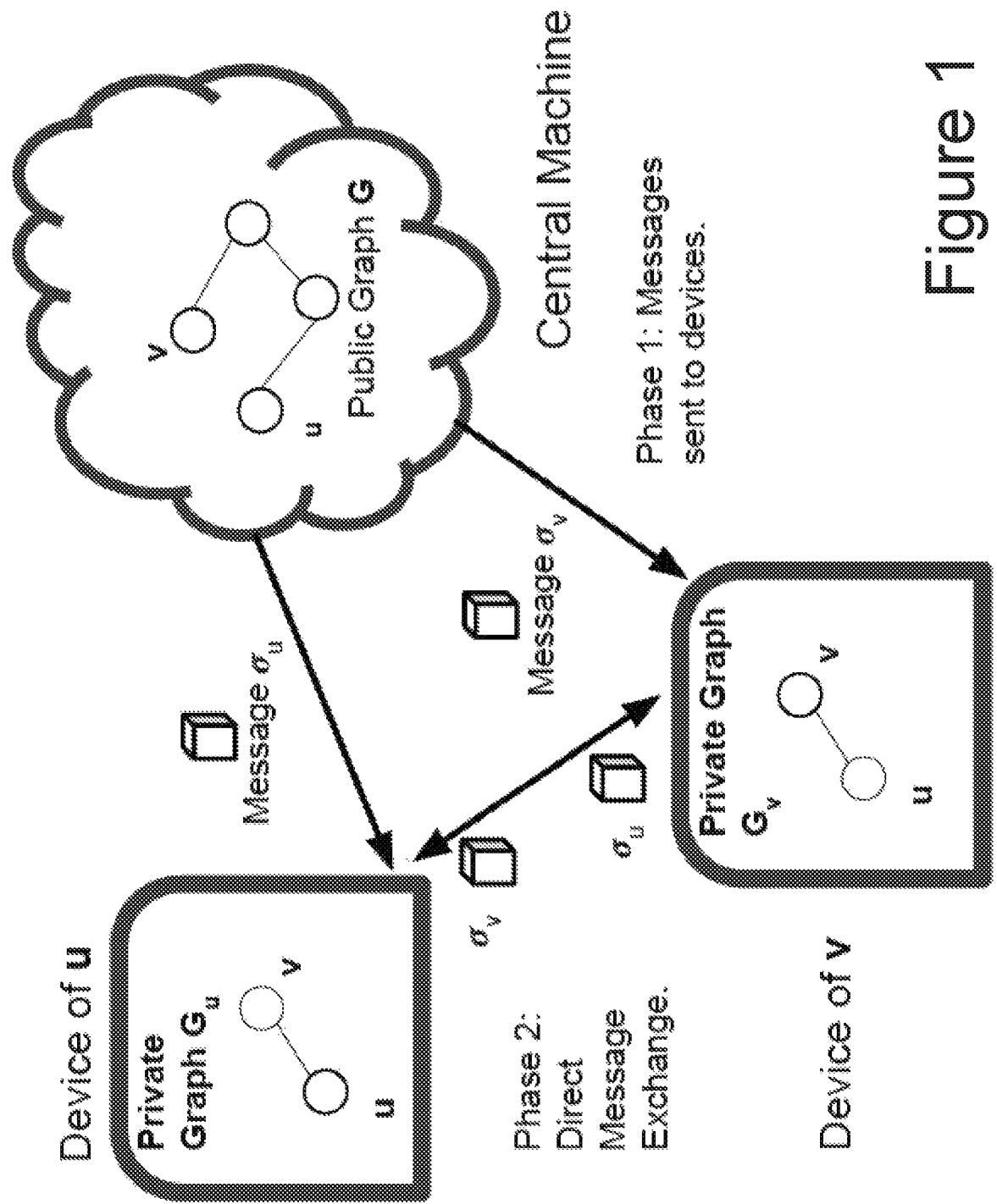
FIG. 1 depicts a graphical diagram of an example on-device public-private model of computation according to example embodiments of the present disclosure.

Reference numerals that are repeated across plural figures are intended to identify the same features in various implementations.

DETAILED DESCRIPTION

1. Overview

Generally, the present disclosure is directed to systems and methods that enhance user privacy by performing efficient on-device public-private computation on a combination of public and private data, such as, for example, public and private graph data. In particular, the on-device public-private computation framework described herein can enable a device associated with an entity to efficiently compute a combined output that takes into account and is explicitly based upon a combination of data that is associated with the entity and data that is associated with one or more other entities that are private connections of the entity, all without revealing to a centralized computing system a set of locally stored private data that identifies the one or more other entities that are private connections of the entity. For example, a centralized system can compute an output for each of a number of entity computing devices based on a set of public data and can transmit each respective output to the corresponding device. The entity computing devices can communicate with each other (e.g., based on respective sets of locally stored private contacts data) to share their respective outputs with each other, thereby enabling each entity computing device to produce a combined output based on the outputs shared by their private contacts, all without sharing the private data with the centralized system in any way.

Thus, example aspects of the present disclosure can be performed by a computing system that includes a central computing system that stores a set of public data and a plurality of entity computing devices that each store a respective set of private data. The set of public data can include a plurality of subsets of the public data that are respectively associated with a plurality of entities that are respectively associated with the plurality of entity computing devices. As an example, the set of public data stored at the central computing system can be a public graph and the subsets of the public data respectively associated with each entity can be respective portions of the public graph that are connected (e.g., within some number of connections) to a node of the public graph that corresponds to the entity (e.g., a "star" rooted at the node). In some implementations, however, all of the public data can be associated with one or more entities rather than just a subset.

The respective set of private data stored by each entity computing device can describe one or more connections (e.g., social network connections, contact lists, customer lists, publication/subscription information, control theory connections, cryptographic connections, etc.) between a corresponding entity of the plurality of entities and one or more connected entities of the plurality of entities. Thus, in some examples, the set of private data can be a private graph that describes social connections between the corresponding entity and the one or more connected entities.

For example, entities can include specific individual users, groups of one or more users, an account associated with an application (e.g., an individual account or an account shared by one or more users such as a corporate account), an organization, a particular device (e.g., an IoT or embedded device), or any other entity with which data may be associated (e.g., an IP address, a geolocation, a business listing, and/or other entities). Although portions of the present disclosure focus for the purpose of explanation on application of aspects of the systems and methods described herein to individual users, all such aspects are equally applicable to operate on basis of entities, rather than specific users.

According to an aspect of the present disclosure, the central computing system can process each respective subset of the public data associated with each entity to produce a respective output for the entity and can transmit each respective output to the corresponding entity computing device. In particular, in some implementations, the central computing system can perform a streaming algorithm on each respective subset of the public data to produce a sketch of the respective subset of the public data. Each resulting sketch can be a much smaller (e.g., in terms of data size) synopsis of the respective subset of the public data. In other implementations, the central machine can also run an algorithm (e.g., a streaming algorithm) on all of the public data to send it to all of the entity devices. Since the public data is publicly available, there is no privacy concern with processing and distributing it in different manners.

According to another aspect of the present disclosure, each entity computing device can communicate with one or more other entity computing devices that are associated with one or more of the connected entities identified in the respective set of private data stored on the entity computing device. In particular, each entity computing device can communicate with the other entity computing devices associated with the connections described in the private data to obtain the respective output (e.g., sketch) received by such other entity computing devices from the central computing system. Each entity computing device can combine its own respective output (e.g., sketch) with those received from the other entity computing devices (possibly along with additional private data stored locally and/or additional private data received from the other entity computing devices) to produce a combined output. In some implementations, if the other entity decides to share its additional private data to this specific entity, this can be done without intervention from the central computing system.

In some implementations, the outputs (e.g., sketches) can be composable. That is, the outputs can be easily and efficiently combined to produce the combined output.

In some instances, the combined output produced by each entity computing device can be a solution provided by a data processing (e.g., graph processing) technique applied to the subsets of public data respectively associated with such device's corresponding entity and some or all of the entities that are connected with such device's corresponding entity in the private data stored on such device. In such fashion, each entity can receive a data processing result that is specific to and based on the specific entity's private connections, but without sharing the private connection data with the central computing system in any way.

One example application of the on-device public-private model of computation provided herein is to social-network based recommender systems whereby a user wants to receive recommendations based on the information available on the user's device, as well as the suggestions of the user's social contacts, without sharing such information or contacts with the central recommendation system. In another example application, a user of a vehicle may wish to determine actions (e.g. routes, time of departure, speed, refueling timings) based upon information available to the user's vehicle, as well as information available to vehicles in the user's private network or local vicinity.

The proposed framework allows a distributed computing architecture to solve many algorithmic problems while providing absolute (deterministic) guarantees of the privacy of on-device data and the user's contacts. In fact, the framework ensures that the private data and contacts are never revealed to the central system. This restrictive model of computation presents several interesting algorithmic challenges because any computation based on private information and contacts needs to be done on local devices of potentially limited capabilities.

Despite these challenges, under realistic assumptions of inter-device communication, the present disclosure provides several efficient algorithms for fundamental data mining and machine learning problems, ranging from k-means clustering to heavy hitters. U.S. Provisional Patent Application No. 62/797,651, which is incorporated into and forms a part of this disclosure, complements this analysis with strong impossibility results for efficient private algorithms without allowing inter-device communication. U.S. Provisional Patent Application No. 62/797,651 also provides example experimental evaluation results, showing that example implementations of the proposed private algorithms provide results almost as accurate as those of the non-private ones while speeding up the on-device computations by orders of magnitude.

More particularly, consider the case of a standard recommender system, such as a service that suggests books to read. The system has a central recommendation provider. The user logs into the system and volunteers ratings for the books already read and, in exchange, receives suggestions for new books to read. Now, assume that the user would like to receive suggestions based on the books read by the user's close friends (for example some or all of the contacts in the user's mobile phone). In a standard centralized system, to obtain such social recommendations the user needs to authorize access to the list of contacts on the user's phone.

This has obvious limitations. The user might want to share the book reviews online and with friends, but at the same time might not want to share the contact list to the system. The standard centralized system architecture does not allow such use cases, as all the data to be processed by the service provider to solve the task of obtaining the reviews (e.g., the book ratings and the social graph) must be stored and processed in a centralized system.

In contrast to this fully centralized system, the present disclosure provides a new framework for distributed computation that can be referred to as the on-device public-private model. This framework allows the user to employ all the information available on the user's device, as well as the user's social contacts, without sharing them with the central system. In particular, the present disclosure shows how to solve several machine learning and data mining problems in this framework without ever having to move the private data to the central system and without needing to reveal the private connections in the social graph. The proposed methods provide absolute (deterministic) guarantees of privacy, as no information based on the private data or the private contacts of the user is shared with the central authority.

This framework is orthogonal to and can be in combination with other privacy-preserving schemes that are actively studied and that are reviewed in the related work: for instance, differential privacy, federated learning, and public-private data models. All these other methods allow strong privacy guarantees, and may complement the proposed techniques, but it should be observed that they do not directly model social-graph-based information or they involve a setting where private data or some information based on it may still need to be collected by the central authority (although in an anonymized or aggregated form).

The present disclosure provides a model that allows general algorithmic problems to be solved while harnessing the social network or other private data of the users. The proposed framework can be seen as an extension to the recent public-private graph model, but contrary to the public-private graph model, does not require any private information to be shared with the central system. The proposed model also allows metadata on nodes of the network to address applications beyond graph analysis. Finally, the present disclosure shows how to achieve this without relying on insertion of noise to obfuscate the output, which might partially degrade it, while achieving, by design, even stronger notions of privacy: private data is only used to provide outputs to the data owner.

Example implementations of the restrictive model of computation provided herein present several interesting algorithmic challenges: since no private information is shared, all computations based on private data must be performed on local devices of potentially limited capabilities. Despite the challenges introduced by the model, efficient algorithms are provided for fundamental data mining and machine learning problems, ranging from clustering to recommendation system applications.

In some implementations, the proposed model can work as follows: the user is allowed to specify an arbitrary partitioning of the local device data as public or private. Moreover, the user is allowed to specify some contacts as private or public. Only the public data and the public contacts are shared to the central system in accordance with the choice of the user. Then, the user wants to obtain some information (e.g., the results of a recommendation system algorithm) on a dataset consisting of all the data to which the user has access, such as the user's private data, all the user's contacts (private or public), and the publicly available information. All of this must be achieved without revealing the private data and the private contacts to the central authority. A formal summary of these results is provided below after defining necessary preliminaries.

Under the realistic assumption of a limited amount of communication among private contacts, the present disclosure demonstrates positive results for addressing general algorithmic problems with applications in, for example, social-network-based recommender systems. In particular, example applications are provided for finding heavy hitter and solving clustering problems (like k-medians, k-means and k-centers).

To further motivate the model, U.S. Provisional Patent Application No. 62/797,651 studies a more restrictive case in which the devices cannot communicate directly with each other. In this no-inter-communication scenario, strong impossibility results for many problems of practical interest are shown, including approximating the distance of users in social networks or counting connected components of the graph. These impossibility results, in turn, motivate the proposed model that allows some (e.g., minimal) communication among devices. On the positive side, it is shown that, informally, even in this restrictive case, any problem that allows a streaming algorithm with a limited amount of space can be solved efficiently.

The systems and methods of the present disclosure provide a number of technical effects and benefits. As one example technical effect and benefit, the systems and methods of the present disclosure enhance user privacy. In particular, the proposed framework enables an entity to receive personalized (e.g., social network specific) processing results without needing to share a set of private data describing connections with a central computing system in any form. Thus, the proposed framework provides an improved computing system that provides personalized results with enhanced privacy, which represents an improvement to the computing system itself.

As another example technical effect and benefit, the systems and methods of the present disclosure can provide efficient on-device computation. In particular, aspects of the present disclosure are directed to a distributed framework in which a computationally powerful central system performs pre-processing on various subsets of public data in order to generate small summaries of the data. The small summaries can then be transmitted to entity devices. The entity devices can share the small summaries in a peer-to-peer fashion and can combine them in an efficient manner (e.g., through composing sketches). In some implementations, the devices may also agree to use another means of communication that involves an intermediary, such as communication via a trusted central authority other than the centralized computing system that holds the public data. For example, the devices may use an end-to-end encrypted messaging application to exchange the packets instead of sharing private data with the centralized computing system that holds the public data.

Thus, the computational work can be shifted to the central computing system, while privacy-sensitive sharing and combination is limited to the entity devices, which may potentially have limited computational abilities/computing resources. Thus, a novel architecture and workflow is provided which addresses and resolves the tension inherent in privacy-preserving on-device computation in resource-constrained devices.

While the above description has been concerned with private connections in the form of social contacts, it will be appreciated that the techniques described herein are not limited thereto and the connections between entity devices may take other forms. For example, entity devices may have direct wired or wireless connections therebetween and it may be desired to keep those connections secret from the central computing system. For example, where devices come into transient geographical proximity, it may be desired to perform processing that uses models stored on each of those devices. Direct communications channels (e.g. wireless connections) may be temporarily established between the proximate to allow for the limited communications between those private devices and the techniques described above used to enable such processing without sharing the details of those connections with the central computing device.

The rest of this disclosure proceeds as follows. Section 2 introduces the proposed models and reviews the prior public-private graph model that inspired the proposed model. Then, Section 3, present the main theoretical results for the proposed model. U.S. Provisional Patent Application No. 62/797,651 shows empirical evaluation of algorithms in the proposed model, reviews related work, and finally, presents certain conclusions.

2. Example On-Device Public-Private Model of Computation

This section formally defines certain example aspects of the on-device public-private model of computation. Before defining the model, this section reviews an example centralized public-private model to distinguish it from the on-device version provided by the present disclosure.

Example Centralized Model

In the (centralized) public-private model of computation, we have a graph G=(V,E), called the public graph, where V is the set of nodes representing users of a system and E is the set of public edges connecting them. Let n=|V| and m=|E|. Then, for each node u∈V, we have an associated private graph $G_u = (\{u\} \cup V_u, E_n)$, over the set of nodes $V_u = \{v_1, \ldots, v_k\} \subseteq V$ representing the private edges of the node. In the discussions that follow, it is assumed that the public and private graphs are undirected, unweighted graphs, but the model can be defined in the obvious way for general graphs. Thus, the systems of the present disclosure are equally applicable to directed graphs, weighted graphs, bipartite graphs, and/or hypergraphs. In addition, although certain portions of the present disclosure focus on the most studied instance of the model (known as the star case) where the set $E_u$ consists of a star centered in u, i.e. $E_u = \{u\} \times V_u$, which represents the private neighbors of the node u, many other model applications or analyses are possible.

In the centralized public-private model of computation, we have a graph problem to solve (e.g., determining the connected component of the graph) and want to output efficiently the solution for the problem for the graph visible to any arbitrary user u (e.g., the public-private graph of node u, $G \cup G_u$) after performing some efficient pre-processing of the public graph G computed by a central machine. More precisely, let P be the pre-processing algorithm. Ideally, example implementations can use an algorithm P that analyzes the public graph G in a time that is polynomial in its size (i.e., O(poly(n+m))), and that outputs a space efficient synopsis P(G) of the public graph with space Õ(n). The notation Õ(·) is used to neglect polylogarithmic factors. Then, the aim of the query algorithm is to take in input for node u the private graph $G_u$ and to output the solution of the problem for $G \cup G_u$ by using the synopsis P(G), in time and space that is ideally near-linear in $|E_u|$ and poly-log(n). Crucially, observe that this model assumes that the query algorithm can access the entire synopsis by making queries to it that depend on the private data. Implicitly, this means that, in the centralized model, the private graph (or some information based on it) resides in the central machine.

Example On-Device Model

In contrast to the centralized model, the systems and methods of the present disclosure enforce that each private graph $G_u$ is stored exclusively on the device owned by the agent u to protect the agent's privacy. In some examples, it can be assumed that private edges of $E_u$ represent (potentially reciprocal) private connections of the user u, e.g., $v \in E_u$ implies that $u \in E_v$ and that u and v know each other and they want their connection to be private to them and not shared to the central authority or any other user. Hence, contrary to the centralized model, the query algorithm must be executed on a device of potentially limited computation power and (crucially) cannot make queries to the central machine that depend on the private edges, as this would reveal the private connections to the shared machine.

To model this, assume, as in the previous model, that a central machine with high computational power can preprocess the public graph G in polynomial time. Then, contrary to the previous model, assume that the query algorithm for $G \cup G_u$ is run on the private device of u that is not capable of storing the whole public graph. Indeed, as the complete graph might be large, some implementations of the present disclosure can restrict the computation power (e.g., both space and running time) on each device to be sublinear in the size of the public graph o(n+m), preferably polylogarithmic in n, and polynomial in the size of the private graph, ideally $\tilde{O}(E_u)$. As this rules out the possibility for the device to store a synopsis of G of size $\Theta(n)$, the device can be allowed to communicate with the central machine and to the other private neighbors' devices with small-size messages.

Example On-Device Communication Protocol

More formally, some implementations of the on-device model assume that the central machine, after pre-processing the public graph G, sends a single message $\sigma_u$ to the device corresponding to the node u of (ideally) poly-log(n) bits (refer to FIG. 1 for a pictorial description of the model). In some implementations, no other communication is allowed with the central machine from the device thereafter. Indeed, the shared machine has no information about the private graph $G_u$, and $\sigma_u$ just depends on the public graph G and node u, thus preserving completely the privacy of the private contacts in $G_u$. Next, the device of u is allowed to directly or indirectly query the device of each private neighbor $v \in E_u$ to receive the same message $\sigma_v$ sent to v by the central machine. This communication does not involve the central authority and so does not leak any information to it. Then, the query algorithm on the device uses the messages received to solve the problem.

For instance, in the book recommendation system example in Section 1, v might be a contact of u in u's favored secure messaging application. u may obtain $\sigma_v$ using the same messaging app to contact v, without thus sharing the app contact list to the book recommendation system provider. Then, u will use the messages received to compute the recommendations on u's device.

Notice that, in this model, all private information is protected by design from being known by the central authority, while only using a single round of small sized communication among private contacts.

Example Application to Metadata

So far, the present disclosure has described a model which only involves graph information. However, the proposed model is equally applicable to public-private (problem-specific) data associated with users as the public-private framework of data summarization. Thus, the proposed on-device framework can handle and process both graph data and non-graph metadata on nodes. Some implementations assume that each node has a problem-specific public metadata $S_u^P$ that can be shared publicly to everyone and a problem-specific private metadata $S_u^V$ that is only available to u. Similar to the graph information, the public metadata can be stored in the central machine, while the private metadata must be processed locally. More sophisticated access controls (who-can-access-what) can be applied as well. To handle the metadata, example implementations of the proposed systems can perform algorithms that use polynomial time and space in the size of all public data for pre-processing and linear time in the private data of a user for the query algorithm.

3. Example Algorithmic Results for the On-Device Model

This section reports certain example algorithmic results. First, the relationships between the centralized and the on-device model are formally studied in Section 3.1. Then example novel algorithmic results are shown for the heavy hitters problem and k-clustering problems.

3.1. Relationships Between the Models

Before introducing the main novel algorithmic results, as a warm-up, this subsection presents a few lemmas to clarify the relationships between the on-device and the centralized model for graph algorithms. In the on-device model, $\Sigma$ can, in some implementations, be defined as the maximum size of a message exchanged in the protocol, while in the centralized algorithm, $|P(G)|$ can be defined as the size of the pre-processing synopsis obtained. First, it is proven that the on-device model is at least as hard as the centralized model, because any on-device algorithm can be implemented in the centralized setting.

Lemma 1: Any on-device public-private graph algorithm with polynomial time pre-processing, $\Sigma \in \tilde{O}(1)$ message size and $\tilde{O}(|E_u|)$ query time, can be implemented in the centralized public-private graph model with polynomial time pre-processing, $|P(G)| \in \tilde{O}(n)$ pre-processing space and $\tilde{O}(|E_u|)$ query time.

Proof. It is easy to observe that using the central machine, one can simulate the on-device protocol by storing in the synopsis all the messages sent to the nodes and reading them from memory during query time. The total space for the pre-processing is hence $\tilde{O}(n\Sigma)$, while the pre-processing time is clearly polynomial. At query time, the central machine reads the $\tilde{O}(|E_u|)$ messages "sent" to u and simulates the on-device query algorithm in $\tilde{O}(|E_u|)$ time.

Another example lemma shows that the contrary is not always true: the on-device mode is strictly harder.

Lemma 2: There exist problems that admit a $|P(G)| \in O(n)$ pre-processing space in the centralized model and for which there is no o(n) message size algorithm in the on-device public-private model.

Proof. To prove this lemma we use the communication complexity of indexing problem, which is formally defined in U.S. Provisional Patent Application No. 62/797,651. Consider the following problem. Each node v has a private unique $id_v$. Also there exists a public mapping $f$ of these private ides into $\{0,1\}$. This mapping is arbitrary distributed over the nodes, i.e., each node v knows one pair $(id'_v, b)$ where $id'_v$ is not necessarily equal to $id_v$. Each node v is interested in knowing $f(id_v)$. Note that given the public data and $id_v$ a centralized algorithm can simply return $f(id_v)$. However, in the on-device model since the server does not have access to the private id $id_v$, it does not know what part of the function $f$ is important for v to send to it. This is equivalent to the indexing problem where Alice holds the public information on the server and Bob holds $id_v$, with a one directional communication channel from Alice to Bob. In order to solve the indexing problem Alice needs to send $\Omega(n)$ bits to Bob.

Despite the on-device model being generally harder, it is now shown that for a significant class of centralized public-private graph algorithms, there is an immediate reduction to the on-device model.

Lemma 3: Suppose for a given problem there exists a centralized public-private algorithm with synopsis P(G) decomposable in n data-structures, $P(G)_u$ for $u \in V$ such that $|P(G)_u| \in \tilde{O}(1)$ and such that the query algorithm for node u solves the problem in $\tilde{O}(|E_u|)$ time by having access only to $P(G)_u$ and $P(G)_v$ for $v \in E_u$. Then, there exists a $\Sigma \in \tilde{O}(1)$ message size and $\tilde{O}(|E_u|)$ query time algorithm in the on-device model.

Proof. The reduction is immediate because the central machine can send message $\sigma_u := P(G)_u$ with space $\tilde{O}(1)$ to each node u, and then the devices can implement the query algorithm using only the messages received from the central machine and their private contacts.

The previous reduction yields directly algorithms in the on-device model for many problems studied in the centralized model such as counting the number of connected components, estimating the size of the reachability set of a user, and several centrality estimations by observing the centralized public-private algorithm defined therein has the property required by Lemma 3. On the other hand, this property does not hold for many important algorithms defined in centralized settings, including approximating shortest path distances between node u and v and estimating several notions of node similarities between them, because such algorithms require arbitrary access to the centralized synopsis. In particular, the central machine needs to be informed about the node v queried from u.

3.2. Example Problems Addressed

This subsection introduces example algorithmic contributions involving a class of problems related to recommendation systems in the on-device public-private model. In a social-network recommendation system, there is a set of arbitrary items $S$ and a graph indicating the social network. We assume the social graph includes a public part G and a private graph $G_u$ for each node u as described above. For each vertex u, we have a set $S_u^P \subseteq S$ of public items and a set $S_u^V \subseteq S$ of private items, respectively, that u likes.

Example implementations of the present disclosure model the problem of implementing a social recommendation system that, given the information in the neighborhood reachable within distance d of a vertex u in the graph visible to u, $G \cup G_u$, returns a subset of items I, with $|I|=k$ to recommend to u. More formally, for a graph $\mathcal{G}$, let $N_u^d(g)$ be the set of vertices reachable from u within a distance at most d on graph $\mathcal{G}$. Let $$S_u^d(\mathcal{G}) = S_u^V \cup \bigcup_{v \in N_u^d(\mathcal{G})} S_v^P$$

be the set of items visible to u in $\mathcal{G}$, i.e., the private items of u plus all public items of nodes reachable from u at distance less than d in the graph $\mathcal{G}$. The notation will drop $\mathcal{G}$ when referring to the public graph G. In particular, the on-device model approximates the output of certain functions specifying relevant items over the set $S_u^d (G \cup G_u)$ to recommend. Example results are as follows.

Uniform Recommendation Function.

A uniform recommendation function is a randomized function that returns a subset of items uniformly at random without replacement from $S_u^d (G \cup G_u)$.

Linear Recommendation Function.

Fix a node u, let $S_v$ be $S_v := S_v^P$ for $v \neq u$ and $S_u := S_u^V \cup S_u^P$ for u. Notice that $S_u^d(G \cup G_u) = \cup_{v \in N_u^d(G \cup G_u)} S_v$. For a fixed u, item $i \in S$ and distance d, define $C_u^i(G \cup G_u)$ as the number of distinct nodes $v \in N_u^d(G \cup G_u)$ for each i that appears in the set $S_v$ defined above. A linear recommendation function is a randomized function that returns a subset of k items I, where the items in I are chosen from $S_u^d (G \cup G_u)$ without replacement with probability proportional to $C_u^i (G \cup G_u)$.

Heavy Hitter.

Let M be a multiset of $S$, i.e., a set of items with repetitions. For parameters ε and κ, heavy hitter is a function that returns a subset of items I from a multiset M with two properties. 1) I contains all items that appear in at least $$\frac{|M|}{\kappa}$$

times in M where |M| is the total number of items counting repetitions; and 2) each item $i \in I$ appears at least $$\frac{|M|}{\kappa} - \varepsilon$$

times in M. For a node u and distance d, let M be the multiset that contains the union (with repetitions) of $S_v$ for distinct $v \in N_u^d(G \cup G_u)$, e.g., all items visible to u counted with the number of users liked by them. Heavy hitters seeks to define all items as defined above.

k-Clustering.

In this case, each item in $S$ represents a point in an arbitrary metric space, and the goal is to pick a set of k points $r_1, \ldots, r_k$ that minimizes the cost function.

$$\left( \sum_{s \in S_u^d(G \cup G_u)} \min_{j=1}^{k} dist(r_j, s)^\rho \right)^{1/\rho},$$

for a particular fixed ρ. ρ=1 corresponds to k-median, ρ=2 to k-means and ρ→∞ to k-center.

The next subsections provide example algorithms with provable theoretical guarantees for all these problems in the proposed model.

3.3. Example General Algorithmic Approach

The general approach of the proposed example algorithms (reported in Algorithm 1) for the previously mentioned problems is to define a composable sketch function sketch over sets of items such that 1) from sketch(A), one can extract k items, approximately solving the problem; 2) sketch(A) has small space $\tilde{O}(k)$; and 3) the sketches computed over two (possibly overlapping) sets of items A and B can be computed easily by composing sketch(A) and sketch (B).

Assume such a function exists, it can be used to compute a sketch $I_u^{d'}$ for the items in the neighborhood at distance at most d' of a node u on the public graph G over the public items $S_u^P$ for all u∈V. These sketches will be computed over the public data in the centralized machine in the pre-processing phase for all integers 1≤d'≤d using the public graph G and the public items $S_u^P$ for all u∈V. Certain sketches (e.g., the sketches for the greatest two distances, i.e., $\sigma_u$: =($I_u^{d-1}, I_u^d$)) will be sent to each individual node u, as the message $I_u^d$. Then the nodes will share the message received from the central machine with their private neighbors and collect their messages. In the query phase, node u will compose the following sketches received $I_u^d$ plus $I_v^{d-1}$ ∀v∈$|E_u|$ to obtain a sketch $I_u$ and finally compose to the sketch computed over the private local items $S_u^V$ and obtain the recommendations from the sketch.

Given this general framework, for each specific problem, it only needs to be shown how the pre-processing phase obtains the sketches $I_u^{d'}$ efficiently, how they can be composed, and how to extract the solution from the sketch.

---
Algorithm 1: General Algorithm
---
Input: G, ∀$_{u∈V}$($S_u^P$, $S_u^V$, $G_u$), d, k
Output: k items for each node u
1. Pre-processing on central machine using G, ∀$_{u∈V}$$S_u^P$.
2. for all u ∈ V, for d' ≤ d do
3.   Let $\bar{S}_u^{d'}$(G):= $\cup_{v∈N_u^{d'}(G)} S_v^P$.
4.   Compute $I_u^{d'}$:= sketch($\bar{S}_u^{d'}$(G)).
5.   Send to u, $\sigma_u$:= ($I_u^{d-1}, I_u^d$).
6. Query algorithm on u's device using $G_u$, $S_u^V$.
7. Receive $\sigma_u$ from central machine.
8. Send $\sigma_u$ to v and receive $\sigma_v$ from v for all v ∈ $E_u$.
9. Compute $I_u^V$:= sketch($S_u^V$).
10. Compose sketches $I_u^V$, $I_v^{d-1}$ for v ∈ $E_u$, and $I_u^d$ to obtain sketch $I_u$.
11. Extract k items from $I_u$.

3.4. Example Uniform Recommendation Function

This subsection defines the sketch for the uniform case. The discussion starts with a simple sketching algorithm that does not work. Assume the public server defines as sketch $I_u^d$ a uniform and independent sample of items from $S_u^d$. Suppose u has two neighbors, v' and v". Let item i∈$S_{v'}^d$, i∈$S_{v''}^d$ and i'∈$S_{v'}^d$, but i'∉$S_{v''}^d$. In this case, the probability that i exists in either one of the samples of v' or v" is more than the probability for element i', which is not desired because it does not allow a simple combination of the two samples.

To resolve this issue, example implementations of the present disclosure assume that there exists a k-minwise independent uniform hash function h: $\mathcal{S}$ →[0,1] from the items to [0,1]. It is also assumed that the function has shared random seeds that are available to all devices and the central machine (i.e., it can be computed consistently in every device). The algorithm is reported in Algorithm 2 below, in which only the details missing from the general Algorithm 1 are added. To sketch a set of items S: hash the items in S and keep the k items with minimum values. Two sketches for sets A, B can be easily composed because one can sort the items in A ∪ B and return the top k by h. Algorithm 2 shows how to use this property to iteratively construct $I_u^{d'}$ for all nodes based on $I_u^{d'}$ and how to initialize $I_u^0$, which is the sketch of $S_u^P$. Then $I_u^{d'}$ is obtained by combining the sketches of $I_v^{d-1}$ for the public neighbors of u and the previous sketch $U_u^{d'-1}$ of u. Finally, the last two sketches for d and d-1 are sent to each device. To construct uniform recommendations, for any v in the private neighborhood of u: query v to obtain $I_v^{d-1}$, construct $U_{v'∈E_u∪G_v} I_{v'}^{d-1} \cup I_u^d$ and compose it with the sketch of the private items in u. Finally, recommend the k items with minimum hash value from the combined sketch.

Theorem 4: Algorithm 2 obtains k uniform recommendations without replacement for each node in the on-device model with total pre-processing time $\tilde{O}(\Sigma_u|S_u P|+kd(m+n))$ using $\tilde{O}(k)$ space messages and $\tilde{O}(|S_u^V|+k|E_u|)$ query time.

One could use $l_0$ sketches on each vertex to provide a uniform recommendation function. See Jowhari, et al., 2011. Tight bounds for 1p samplers, finding duplicates in streams, and related problems. In *Proceedings of the thirtieth ACM SIGMOD-SIGACT-SIGART symposium on Principles of database systems*, ACM 49-58. However, $l_0$ samplers provide independent samples (i.e., with replacements). This can be resolved by using more sketches on each vertex and removing duplicated items, but $l_0$ samplers are designed to handle deletions of items as well, which is not necessary here.

---
Algorithm 2: Algorithm for Uniform Recommendation Function
---
Input: G, ∀$_{u∈V}$($S_u^P$, $S_u^V$, $G_u$), d, k, a hash function h(·)
Output: k uniform sample items for each node u
1. Obtaining $I^{d'}$'s during pre-processing
2. For d' = 0
3. for all u ∈ V do
4.   Sort items in i ∈ $S_u^P$ based on hash h(i) and let $I_u^0$ be the first k items by h(·).
5. for d' ∈ {1 ... d}for u ∈ V do
6.   Let $\hat{I}_u^{d'}$ be the union of $I_u^{d-1} \cup U_{v∈N(u)} I_v^{d-1}$ where N(u) refers to graph G.
7.   Sort items in $\hat{I}_u^{d'}$ based on h(i) and let $I_u^{d'}$ be the first k items.
8. Query algorithm on u's device using same h(·) function.
9. Let $I_u^V$ be the top k items by h(·) in $S_u^V$.
10. Compute $\hat{I}_u$ as union of $I_u^V$, $I_v^{d-1}$ for v ∈ $E_u$, and $I_u^d$.
11. Extract k items from $\hat{I}_u$ by h(·).

3.5. Example Linear Recommendation Function

This subsection provides an example technique to recommend k items without replacement from $S_u^d(G \cup G_u)$ with probability proportional to $C_u^i(G \cup G_u)$.

First, this subsection gives a simple example to show that, unlike the uniform sampling case, several copies of independent samplers are not useful to solve the problem efficiently. Suppose we have only items i and i', and $C_u^i(G \cup G_u)$=n and $C_u^{i'}(G \cup G_u)$=1. Note that any sampler that samples 2 items without replacement reports both i and i'. However, sampling one item gives i with probability $$\frac{n}{n+1}$$

and i' with probability $$\frac{1}{n+1}.$$

Hence, in expectations, we need to make O(n) linear samplings with replacement to observe i' once, which is not desirable.

Here again, we use k-minwise hash functions with shared random bits in a similar fashion to Algorithm 2. The key difference with the algorithm is in the sketch method, which instead of hashing items $\mathcal{S}$ to [0,1], it hashes pairs of items (i,u) to [0,1] where i is an item and u is a vertex containing i in its items. We first focus on the pre-processing. For each vertex u, we define $T_u^d = \{(v,i) | v \in N_v^d(G) \text{ and } i \in S_v^P\}$. We define the sketch $I_u^d$ to be the set of k pairs in $T_u^d$ with minimum hash values and with distinct items (i.e., when an item appears several times, we only keep the pair with lowest hash value for that item). It is easy to see that such sketches can be computed iteratively as in the uniform case. Notice also that at query time for node u, by having access to $I_u^d$, $I_v^{d-1}$ for $v \in E_u$ and $S_u^V$, one can construct in the same way a sketch for $S_u^d(G \cup G_u) = \bigcup_{v \in N_u^{d(G \cup G_u)}} S_v$, where $S_v$ is defined as $S_v$: $S = S_v^P$ for $v \neq u$ and $S_u = S_u^P \cup S_u^V$.

To construct the linear recommendations, we recommend the k distinct items with minimum hash values in the combined sketch of $S_u^d (G \cup G_u)$. Notice that the recommended set is equivalent to the set of the k distinct items with minimum hash values in $T_u^d(G \cup G_u) = \{(v,i) | v \in N_u^d (G \cup G_u) \text{ and } i \in S_v\}$. Hence, the probability that a pair corresponding to an item i has the minimum hash value is proportional to its frequency $C_u^i$ as desired. After removing the pairs corresponding to the first item, the same argument holds for the second item and so on. This allows showing the following theorem.

Theorem 5: The previous algorithm obtains k linear recommendations without replacement for each node in the on-device model with total pre-processing time $\tilde{O}(\Sigma_u |S_u^P| + kd(m+n))$ using $\tilde{O}(k)$ space messages and $\tilde{O}(|S_u^V| + k|E_u|)$ query time.

3.6. Example Heavy Hitters

This subsection provides a technique to recommend heavy hitters. Fix a probability $0 < \delta < 1$. Let $s = |S|$ be the total number of items. Use a similar technique to the linear case, except use $$H = 12 \log \frac{2s}{\delta} \varepsilon^{-2}$$

fully independent hash functions. As in the linear recommendations case, each hash function maps a pair (u,i) of user and item to [0,1]. The sketch $I_u^d$ keeps H pairs, one per function, such that for each function, the pair stored is the one with minimum hash value over the items inserted in the sketch. The sketch is composable. The construction of the sketches in the pre-processing and query time is the same as in the linear case. The final sketch $I_u^d$ constructed at query time is a list of $$\frac{12 \log \frac{2s}{\delta}}{\varepsilon^2}$$

items sampled independently, this time with replacement, from $N_u^d(G \cup G_u)$ with probability proportional to $C_u^d(G \cup G_u)$. Recommend an item if and only if it appears at least $$\left(\frac{1}{\kappa} - \frac{\varepsilon}{2}\right) \frac{12 \log \frac{2s}{\delta}}{\varepsilon^2}$$

times in the list $I_u^d$.

Given the result in Theorem 5, it is easy to adapt the proof to show the following bound on the running time and message space.

Lemma 6: The previous algorithm obtains runs in the on-device model with total pre-processing time $\tilde{O}(\Sigma_u |S_u^P| H + d(m+n)H)$ using $\tilde{O}(H)$ space messages and $\tilde{O}(|S_u^V| H + |E_u| H)$ query time.

With a little more work, we can also show the following lemma.

Lemma 7: The algorithm defined above returns the heavy hitter items in the neighborhood of u, with probability $1-\delta$.

Proof. For simplicity of notation, we write $C_u^i$ for $C_u^i (G \cup G_u)$ and the fixed d. Let $i - S$ be an arbitrary item. Also, let $X^i$ be the number of times i appears in $I_u^d$. Note that each element in $S$ is i with probability $$\frac{c_u^i}{\sum_{j \in S} c_u^j}$$

independently, and hence, $X^i$ is sum of independent random variables.

By the Chernoff bound we have $$Pr\left[\left|X^i - \frac{C_u^i}{\sum_{j \in I} C_u^j} \frac{12 \log \frac{2s}{\delta}}{\varepsilon^2}\right| \geq 0.5\varepsilon \frac{12 \log \frac{2s}{\delta}}{\varepsilon^2}\right] =$$

$$Pr\left[|X^i - E[X^i]| \geq 0.5\varepsilon \frac{12 \log \frac{2s}{\delta}}{\varepsilon^2}\right]$$

which by $$E[X^i] = \frac{c_u^i}{\sum_{j \in I} C_u^j} \frac{12 \log \frac{2s}{\delta}}{\varepsilon^2}$$

is $$\leq 2\exp\left(-\frac{1}{3} E[X^i] \left(\frac{0.5\varepsilon \frac{12 \log \frac{2s}{\delta}}{\varepsilon^2}}{E[X^i]}\right)^2\right) \leq 2\exp\left(-\frac{\log \frac{2s}{\delta} \frac{12 \log \frac{2s}{\delta}}{\varepsilon^2}}{E[X^i]}\right)$$

which again by $$E[X^i] = \frac{C_u^i}{\sum_{j \in I} C_u^j} \frac{12 \log \frac{2s}{\delta}}{\varepsilon^2}$$

and since $$\frac{C_u^i}{\sum_{j \in I} C_u^j} \leq 1$$

is $$\le 2\exp\left(-\frac{\log\frac{2s}{\delta}}{\frac{C_u^i}{\sum_{j\in I} C_u^j}}\right) \le 2\exp\left(-\log\frac{2s}{\delta}\right) = \frac{\delta}{s}$$

Then by union bound over all choices of $i \in I$ we have $$Pr\left[\forall_{i\in I} \left|X^i - \frac{C_u^i}{\sum_{j\in I} C_u^j}\frac{12\log\frac{2s}{\delta}}{\varepsilon^2}\right| \ge 0.5\varepsilon\frac{12\log\frac{2s}{\delta}}{\varepsilon^2}\right] \le$$

$$\sum_{i\in I} Pr\left[\left|X^i - \frac{C_u^i}{\sum_{j\in I} C_u^j}\frac{12\log\frac{2s}{\delta}}{\varepsilon^2}\right| \ge 0.5\varepsilon\frac{12\log\frac{2s}{\delta}}{\varepsilon^2}\right] \le \sum_{i\in I}\frac{\delta}{s} = \delta.$$

Therefore, with probability $1-\delta$ simultaneously for all $i\in I$ we have $$\left|X^i - \frac{C_u^i}{\sum_{j\in I} C_u^j}\frac{12\log\frac{2s}{\delta}}{\varepsilon^2}\right| \le 0.5\varepsilon\frac{12\log\frac{2s}{\delta}}{\varepsilon^2}. \quad (1)$$

The next expressions prove the statement of the lemma assuming that Inequality 1 holds. First, assume $$X^i \ge \left(\frac{1}{\kappa} - \frac{\varepsilon}{2}\right)\frac{12\log\frac{2s}{\delta}}{\varepsilon^2}.$$

Using inequality 1 we have $$\frac{C_u^i}{\sum_{j\in I} C_u^j}\frac{12\log\frac{2s}{\delta}}{\varepsilon^2} \ge X_i - 0.5\varepsilon\frac{12\log\frac{2s}{\delta}}{\varepsilon^2} \ge$$

$$\left(\frac{1}{\kappa} - \frac{\varepsilon}{2}\right)\frac{12\log\frac{2s}{\delta}}{\varepsilon^2} - 0.5\varepsilon\frac{12\log\frac{2s}{\delta}}{\varepsilon^2} = \left(\frac{1}{\kappa} - \varepsilon\right)\frac{12\log\frac{2s}{\delta}}{\varepsilon^2},$$

which means if an item i is picked we have $$C_u^i \ge \left(\frac{1}{\kappa} - \varepsilon\right)\sum_{j\in I} C_u^j$$

as desired. Now assume $$C_u^i \ge \frac{\sum_{j\in I} C_u^j}{\kappa}.$$

Using Inequality 1 we have $$X_i \ge \frac{C_u^i}{\sum_{j\in I} C_u^j}\frac{12\log\frac{2s}{\delta}}{\varepsilon^2} - 0.5\varepsilon\frac{12\log\frac{2s}{\delta}}{\varepsilon^2} \ge \frac{\sum_{j\in I} C_u^j}{\kappa \sum_{j\in I} C_u^j}\frac{12\log\frac{2s}{\delta}}{\varepsilon^2} - 0.5\varepsilon\frac{12\log\frac{2s}{\delta}}{\varepsilon^2} =$$

$$\left(\frac{1}{\kappa} - \frac{\varepsilon}{2}\right)\frac{12\log\frac{2s}{\delta}}{\varepsilon^2},$$

which means that if $$C_u^i \ge \frac{\sum_{j\in I} c_u^j}{s},$$

we pick i.

3.7. Example k-Clustering

The example algorithm in this section is based on the notion of composable coresets. See Bateni et al., 2014. Distributed balanced clustering via mapping coresets. In *Advances in Neural Information Processing Systems*. 2491-2599.

Given a linear space $\alpha$-approximation algorithm for k-clustering problem for a fixed $\rho$ norm (e.g. $\rho=1$ for k-median, $\rho=2$ for k-means, $\rho=\infty$ for k-center), the following procedure provides an $O(\alpha)$-approximate solution of the problem: Arbitrary decompose the points into disjoint sets $U_1, \ldots, U_t$. Inside each set $U_i$ select an approximate solution of size $\tilde{\Theta}(k)$. We call these points representatives. Then for each point in $U_i$ that is not a representative, move it to the location of the closest representative point in $U_i$. Now one can represent the new dataset by distinct point locations and their multiplicities, which are composable coresets. Then, combine the composable coresets and solve the problem on the new dataset. This in known to provide a $O(\alpha)$-approximation. Notice that the challenge to applying this method is that the points in the sets $S_u^P, S_u^V$ for $u \in V$ are not necessarily disjoint.

Similar to the technique in previous sections, for each node u we keep a composable coreset of the points in $\cup_{v \in N_u^{d'}(G)} S_v^P$ for $d'=d$ and $d'=d-1$, for each node. For example, in some implementations, this can be done by first running a BFS search from each node u, gather the points in $S_v^P$ for $v \in N_u^{d'}G)$, and find the corresponding core-sets $I_u^{d'}$ as in Bateni et al. Note that this preprocessing step can be implemented in $\tilde{O}(k|V|)$ space and polynomial time. Then u receives $I_v^{d-1}$ from each vertex v in its private neighborhood. u merges the coreset $I_v^d$ and the coresets from private neighbors $I_v^{d-1}$ and solves the problem. Note that core-sets $I_v^{d-1}$ corresponds to not necessarily disjoint sets. However, each point appears at most $|E_u|+1$ times in these core-sets, where $|E_u|$ is the number of private neighbors of u. Therefore, the approximation factor is increased by a factor at most $|E_u|+1$. This implies the following theorem, where as in [?] we assume there is a polynomial time, linear space, $\alpha$-approximation algorithm Alg for k-clustering in the norm $\rho$.

Theorem 8: The previous algorithm obtains a $O(\alpha|E_u|)$-approximate k-clustering in the norm $\rho$, for each node u, in the on-device model with polynomial time preprocessing, using $\tilde{O}(k)$ space messages, and using query time polynomial in $|S_u^V|$, k and $|E_u|$, as desired.

Specifically, the total pre-processing time is $$\tilde{O}\left(\sum_u f\left(\left|\bigcup_{v \in N_u^{d'}(G)} S_v^P\right|\right) + m + \sum_u \sum_{v \in N_u^d(G)} |S_u^P|\right)$$

and query time is $\tilde{O}(f(|S_u^V|+k|E_u|))$, where $f(\cdot)$ indicates the running time of the offline algorithm Alg.

The previous algorithm increase $|E_u|$ in the approximation factor is due to the possibility of items appearing in multiple core-sets. The next subsection provides a sketching technique that allow to reduce the weight of the duplicated points from the core-sets. By applying this sketching, the proposed algorithm is (approximately) using the true weight of the points in the coreset. While this heuristic does not improve the approximation factor in the worse case, this theoretically-sound heuristic improves the results in practice.

3.7.1. Example Techniques for Removing Duplicated Items

As mentioned earlier in this subsection composable core-sets are designed to work with disjoint sets (i.e. a decomposition of the input set). However, in the case of the proposed application if a vertex v is reachable from two private neighbors of u (via distance less than d), the items (i.e. points) of v appear in both of these neighbors. Hence we double count the weight of these items on the representative items. If we could explicitly keep the set of the items assigned to the representative items (which we refer to as $A_1, \ldots, A_t$ for simplicity of notation), we could directly indicate the duplicated items and remove their weights from the representative items. However, this might not be practical due to the large size of these sets. In this subsection we provide a technique to sketch these sets such that we can remove the weight of the duplicated items almost precisely (i.e. with an ε error) using a smaller memory. Next, a tool to deal with sets that are not disjoint for composable coresets is provided.

Let A be a collection of items and let $A_1, \ldots, A_t \subseteq A$ be a collection of subsets of A. Without loss of generality we assume $|A_1| \geq |A_2| \geq \ldots \geq |A_t|$. Let $\Delta$ be an upper bound on the number sets that contains α, for any arbitrary $α \in A$. Let $h(\cdot)$ be a universally shared hash function that hashes $A \rightarrow [0, 1]$ uniformly at random. Let $\hat{A}_i$ to be the subset of $A_i$ with hash value at most $$\lambda_i = \frac{6\log(\delta t)\Delta^2}{\varepsilon^2} \frac{1}{|A_i|}.$$

Note that, we have $$E[|\hat{A}_i|] = |A_i| \frac{6\log(\delta t)\Delta^2}{\varepsilon^2} \frac{1}{|A_i|} = \frac{6\log(\delta t)\Delta^2}{\varepsilon^2} \in \tilde{O}(\Delta^2).$$

For $i \in \{1, \ldots, t\}$ we define $B_i = \{α | α \in A_i \& \delta_{j>i} α \in A_j\}$. This intuitively says that to construct $B_i$s from $A_i$s, we remove duplicated items from the larger sets and keep them in the smaller ones. Similarly, for $i \in \{1, \ldots, t\}$ we define $\hat{B}_i = \{α | α \in \hat{A}_i \& \delta_{j>i} α \in \hat{A}_j\}$.

Lemma 9: With probability at least $1-\delta^{-1}$, simultaneously, for all $i \in \{1, \ldots, t\}$ we have $$\left||B_i| - \frac{1}{\lambda_i}|\hat{B}_i|\right| \leq \varepsilon \frac{|A_i|}{\Delta}.$$

Proof. Let $Y_α^i$ be a binary variable that is 1 if $α \in B_i$ and 0 otherwise. Notice that, we have $$\sum_{α \in A} Y_α^i = |B_i|. \quad (2)$$

Let $X_α^i$ be a random variable that is 1 if $α \in B_i$ & $h(α) \leq \lambda_i$. Note that, we have $$E\left[\sum_{α \in A} X_α^i\right] = \lambda_i |B_i|. \quad (3)$$

Recall that, we have $|A_1| \geq |A_2| \geq \ldots \geq |A_t|$. This means that we have $\lambda_1 \leq \ldots \leq \lambda_t$. Thus, if for an index i and an item a we have $h(α) \leq \lambda_i$, then for any $j \geq i$ we have $h(α) \leq \lambda_j$. Therefore, $α \in B_i$ & $h(α) \leq \lambda_i$ is equivalent to $α \in \hat{B}_i$. This means that $$\sum_{α \in A} X_α^i = |\hat{B}_i| \quad (4)$$

Note that, for a fixed i, $α \in B_i$ is defined deterministically and $h(α) \leq \lambda_i$ happens independently for different choices of α. Hence, $|\hat{B}_i| = \Sigma_{α \in A} X_α^i$ is sum of independent random variables. By the Chernoff bound we have $$Pr\left[\left||\hat{B}_i| - E[\hat{B}_i]\right| \geq \varepsilon \frac{\lambda_i |A_i|}{\Delta}\right] \leq 2\exp\left(\frac{1}{3}E[\hat{B}_i]\left(\varepsilon \frac{\frac{\lambda_i |A_i|}{\Delta}}{E[\hat{B}_i]}\right)^2\right) =$$

$$2\exp\left(\frac{1}{3}\frac{\varepsilon^2 \lambda_i^2 |A_i|^2}{E[\hat{B}_i]d^2}\right) = 2\exp\left(\frac{1}{3}\frac{\varepsilon^2 \lambda_i^2 |A_i|^2}{\lambda_i |B_i|d^2}\right) \text{ By Equalities 3,}$$

$$4 = 2\exp\left(\frac{1}{3}\frac{\varepsilon^2 \lambda_i |A_i|^2}{|B_i|d^2}\right) =$$

$$2\exp\left(\frac{2\log(\delta t)|A_i|}{|B_i|}\right) \text{ By } \lambda_i = \frac{6\log(\delta t)\Delta^2}{\varepsilon^2}\frac{1}{|A_i|} \leq 2\exp(2\log(\delta t)) = \frac{2}{\delta^2 t^2}.$$

Next by applying the union bound over all choices of i, we have $$Pr\left[\exists_i \left||\hat{B}_i| - E[\hat{B}_i]\right| \geq \varepsilon \frac{\lambda_i |A_i|}{\Delta}\right] \leq$$

$$\sum_{i=1}^{t} Pr\left[\left||\hat{B}_i| - E[\hat{B}_i]\right| \geq \varepsilon \frac{\lambda_i |A_i|}{\Delta}\right] \leq \sum_{i=1}^{t} \frac{2}{\delta^2 t^2} = \frac{2t}{\delta^2 t^2} \leq \delta^{-1}.$$

Assuming $\delta \leq 0.5$

Example Devices and Systems

Figure 2A:
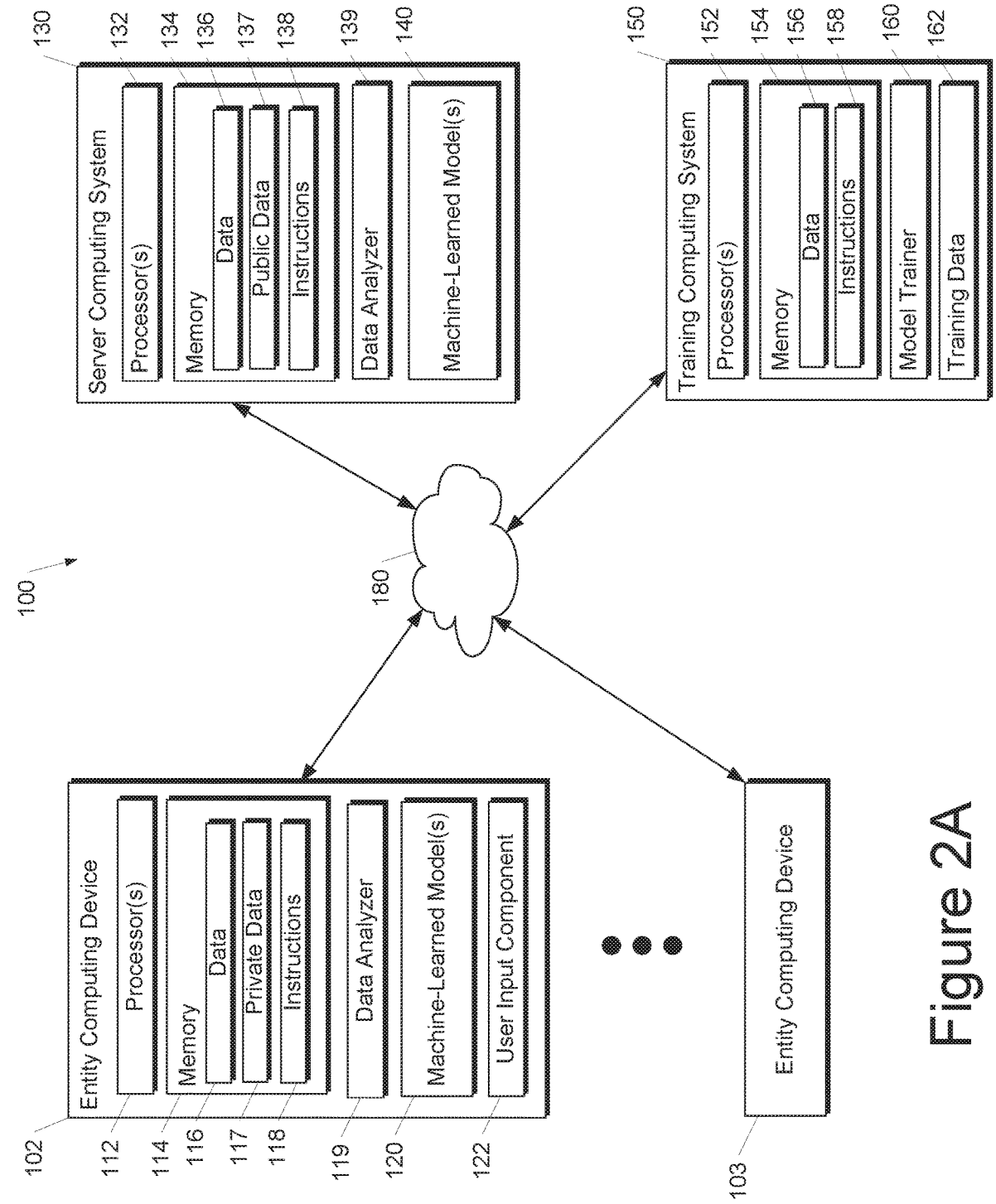
FIG. 2A depicts a block diagram of an example computing system according to example embodiments of the present disclosure.

FIG. 2A depicts a block diagram of an example computing system 100 that performs on-device public-private computation according to example embodiments of the present disclosure. The system 100 includes an entity computing device 102, a server computing system 130, and a training computing system 150 that are communicatively coupled over a network 180. System 100 is provided as one example. Various other and different computing systems can be used to implement aspects of the present disclosure.

The entity computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The entity computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the entity computing device 102 to perform operations.

The entity computing device 102 can include one or more sets of private data 117. For example, the private data 117 can be a private graph. In some examples, the private data 117 can describe one or more relationships (e.g., social relationships) between an entity associated with the entity computing device 102 and one or more other entities associated with one or more entity computing devices (e.g., device 103). In some examples, the private data 117 can include problem-specific private metadata.

The entity computing device 102 can include a data analyzer 119. The data analyzer 119 can analyze or otherwise process various sets of data such as the private data 117 and/or data received from the server computing system 130. As one example, the data analyzer 119 can perform a query function on various sets of data (e.g., data sketches). In some implementations, the data analyzer 119 can combine (e.g., compose) multiple outputs (e.g., sketches) to form a combined output (e.g., combined sketch).

In some implementations, the entity computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the entity computing device memory 114, and then used or otherwise implemented by the one or more processors 112. In some implementations, the entity computing device 102 can implement multiple parallel instances of a single machine-learned model 120.

Additionally or alternatively, one or more machine-learned models 140 can be included in or otherwise stored and implemented by the server computing system 130 that communicates with the entity computing device 102 according to a client-server relationship. For example, the machine-learned models 140 can be implemented by the server computing system 140 as a portion of a web service. Thus, one or more models 120 can be stored and implemented at the entity computing device 102 and/or one or more models 140 can be stored and implemented at the server computing system 130.

The entity computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

The server computing system 130 can include one or more sets of public data 137. For example, the public data 137 can be a public graph. In some examples, the public data 137 can include a plurality of portions that are respectively associated with a plurality of entities. In some examples, the public data 137 can include problem-specific public metadata.

The server computing system 130 can include a data analyzer 139. The data analyzer 139 can analyze or otherwise process various sets of data such as the public data 137 or respective portions thereof. As one example, the data analyzer 139 can perform a pre-processing function on various sets of data (e.g., portions of the public data 137) to produce a respective output. For example, pre-processing the data can include generating a sketch of the data.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The entity computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the entity computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the entity computing device 102. Thus, in such implementations, the model 120 provided to the entity computing device 102 can be trained by the training computing system 150 on user-specific data received from the entity computing device 102. In some instances, this process can be referred to as personalizing the model.

Each of the data analyzer 119, the data analyzer 139, and the model trainer 160 includes computer logic utilized to provide desired functionality. Each of the data analyzer 119, the data analyzer 139, and the model trainer 160 can be implemented in hardware, firmware, and/or software controlling a general purpose processor. For example, in some implementations, each of the data analyzer 119, the data analyzer 139, and the model trainer 160 includes program files stored on a storage device, loaded into a memory and executed by one or more processors. In other implementations, each of the data analyzer 119, the data analyzer 139, and the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2A illustrates one example computing system that can be used to implement the present disclosure. Other computing systems can be used as well. For example, in some implementations, the entity computing device 102 can include the model trainer 160 and the training dataset 162. In such implementations, the models 120 can be both trained and used locally at the entity computing device 102. In some of such implementations, the entity computing device 102 can implement the model trainer 160 to personalize the models 120 based on user-specific data.

Figure 2B:
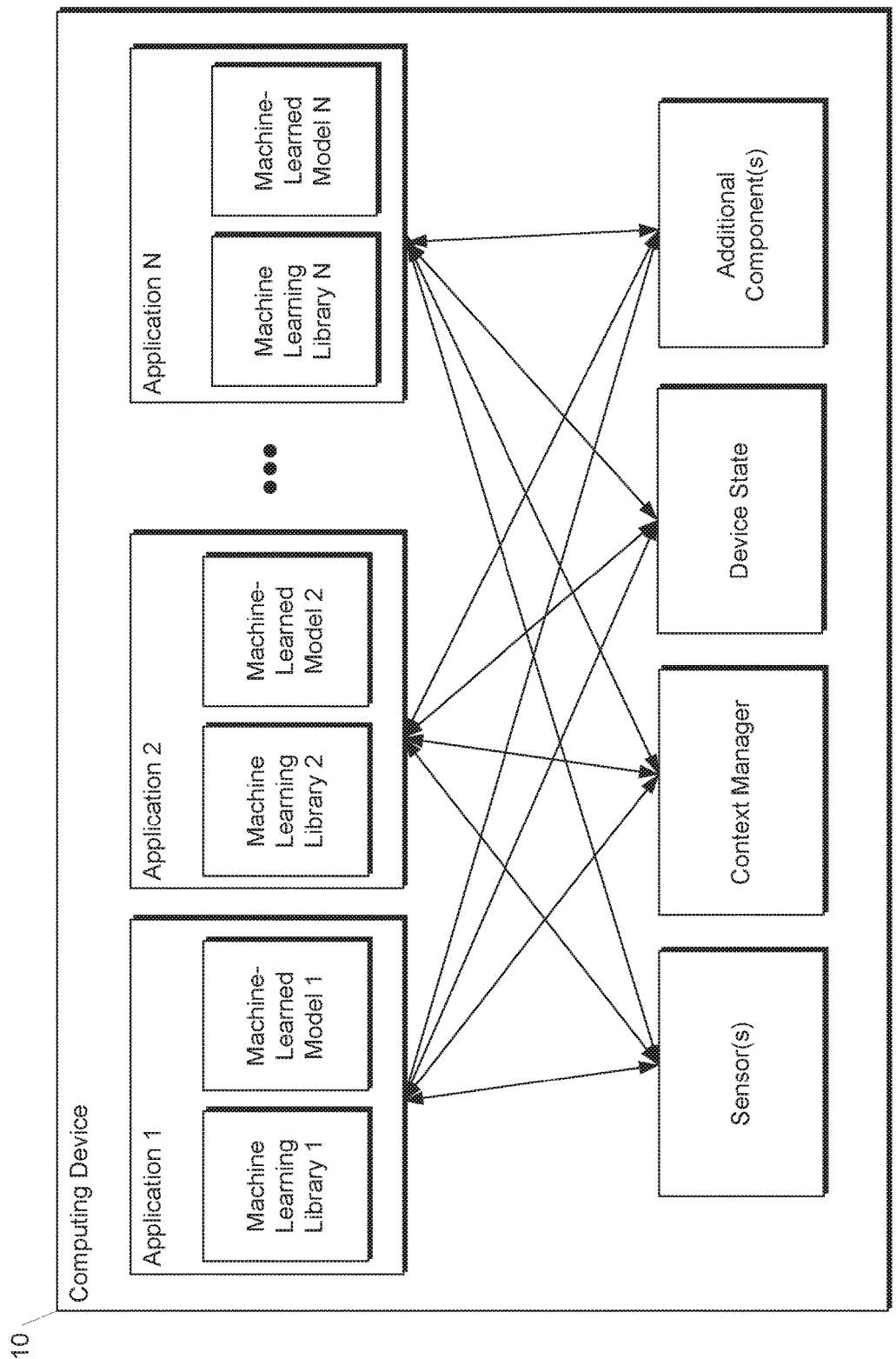
FIG. 2B depicts a block diagram of an example computing device according to example embodiments of the present disclosure.

FIG. 2B depicts a block diagram of an example computing device 10 that performs according to example embodiments of the present disclosure. The computing device 10 can be a entity computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 2B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 2C:
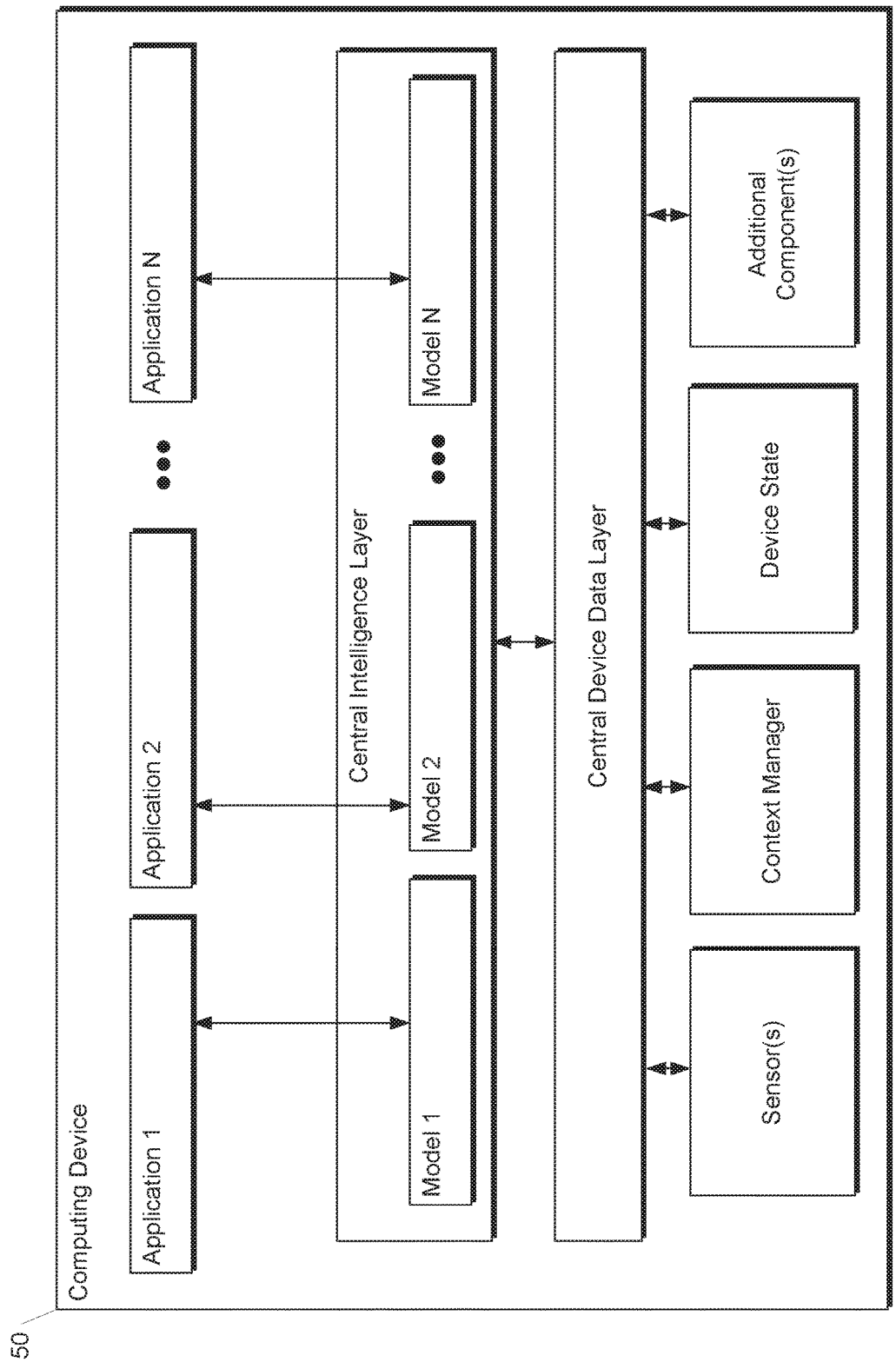
FIG. 2C depicts a block diagram of an example computing device according to example embodiments of the present disclosure.

FIG. 2C depicts a block diagram of an example computing device 50 that performs according to example embodiments of the present disclosure. The computing device 50 can be a entity computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 2C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 2C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 3:
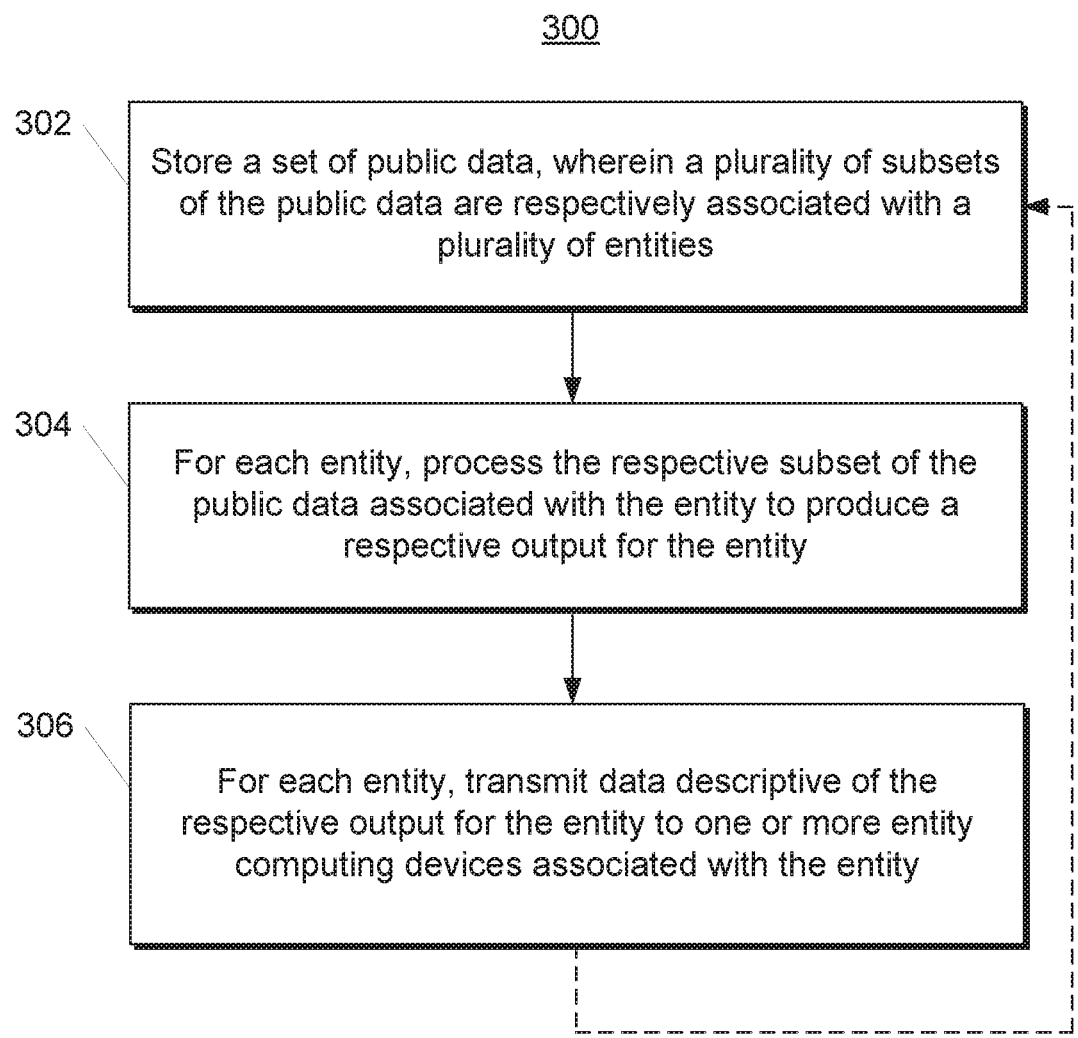
FIG. 3 depicts a flow chart diagram of an example method to perform public-private data computation according to example embodiments of the present disclosure.

FIG. 3 depicts a flow chart diagram of an example method 300 to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure. In one example, the method 300 can be performed by a centralized computing system.

At 302, the computing system can store a set of public data. A plurality of subsets of the public data are respectively associated with a plurality of entities. For example, entities can include specific individual users, groups of one or more users, an account associated with an application (e.g., an individual account or an account shared by one or more users such as a corporate account), an organization, a particular device (e.g., an IoT or embedded device), or any other entity with which data may be associated (e.g., an IP address, a geolocation, a business listing, and/or other entities).

At 304, the computing system can, for each entity, process the respective subset of the public data associated with the entity to produce a respective output for the entity. As one example, processing the respective subset of the public data associated with the entity to produce the respective output for the entity at 304 can include performing a streaming algorithm on the respective subset of the public data associated with the entity to produce a respective sketch for the entity.

In one example, the public data can be a public graph and processing the public graph can include performing a graph processing technique on the public graph. For example, performing the graph processing technique can include performing a uniform recommendation function; a linear recommendation function; a heavy hitter function; and/or a k-clustering function.

At 306, the computing system can, for each entity, transmit data descriptive of the respective output for the entity to one or more entity computing devices associated with the entity.

After 306, the method 300 can optionally return to block 302. For example, the computing system can iteratively perform various steps of method 300 as additional data is received. For example, the respective output for a particular entity can be re-computed and re-transmitted as soon as additional public data associated with the particular entity is received. Alternatively or additionally, the respective output for a particular entity can be re-computed and re-transmitted periodically according to a schedule.

Figure 4:
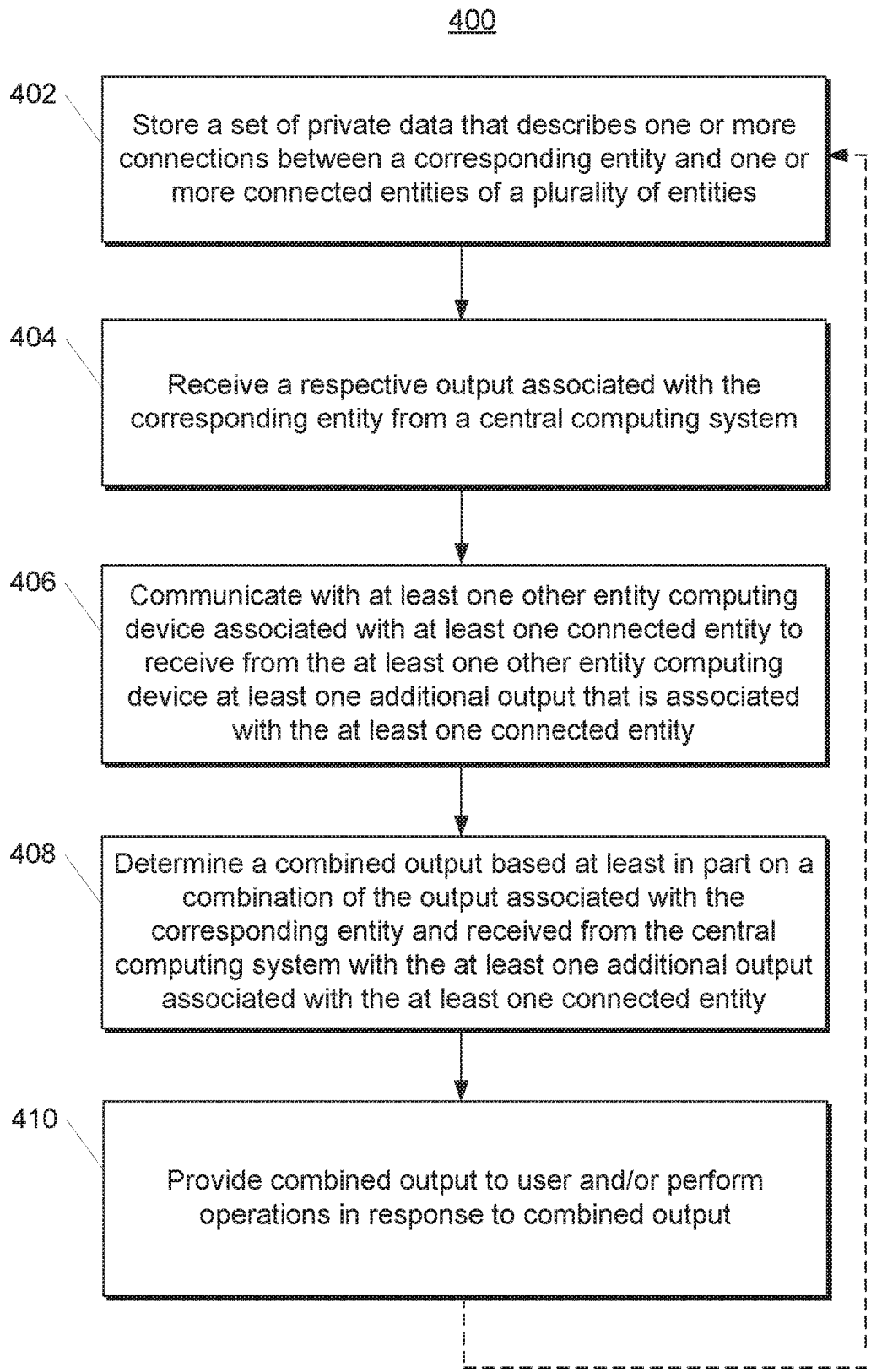
FIG. 4 depicts a flow chart diagram of an example method to perform public-private data computation according to example embodiments of the present disclosure.

FIG. 4 depicts a flow chart diagram of an example method 400 to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure. In one example, the method 400 can be performed by an entity computing device.

At 402, the entity computing device can store a set of private data that describes one or more connections between a corresponding entity and one or more connected entities of a plurality of entities. For example, the connections can include social network connections, contact lists, customer lists, publication/subscription information, control theory connections, cryptographic connections, etc. In some implementations, the private data can be a private graph.

At 404, the entity computing device can receive a respective output associated with the corresponding entity from a central computing system. In some implementations, the respective output associated with the corresponding entity can be a respective sketch associated with the corresponding entity and generated through performance, for example, of a streaming algorithm.

At 406, the entity computing device can communicate with at least one other entity computing device associated with at least one connected entity to receive from the at least one other entity computing device at least one additional output that is associated with the at least one connected entity. The at least one other entity computing device can have received the at least one additional output from the central computing system. As one example, the at least one additional output associated with the at least one connected entity can be at least one additional sketch associated with the at least one connected entity.

In some implementations, the communication(s) with the other entity computing device(s) can be direct communications. In some implementations, the communication(s) with the other entity computing device(s) can be indirect communications. In some implementations, the communication(s) with the other entity computing device(s) can be encrypted (e.g., end-to-end encrypted).

In some implementations, the entity computing device may also communicate with the at least one other entity computing device associated with the at least one connected entity to receive from the at least one other entity computing device an additional set of private data that is private to the at least one entity computing device.

At 408, the entity computing device can determine a combined output based at least in part on a combination of the respective output associated with the corresponding entity and received from the central computing system with the at least one additional output associated with the at least one connected entity. For example, determining the combined output can include composing the respective sketch associated with the corresponding entity and received from the central computing system with the at least one additional sketch associated with the at least one connected entity to obtain a combined sketch.

In some implementations, the combined output can also be produced based on an additional set of private data that was private to and received from the at least other one entity computing device and/or an additional set of private data that is stored locally on and private the entity computing device.

At 410, the entity computing device can provide the combined output to the user and/or perform operations in response to the combined output. As one example, the combined output can be or describe one or more recommended items and, at 410, the entity computing device can provide the one or more recommended items to the user (e.g., as part of a graphical display included in a user interface of the device).

After 410, the method 400 can optionally return to block 402 or elsewhere. For example, the entity computing device can iteratively perform various steps of method 400 as additional data is received. For example, the respective outputs can be re-shared and re-combined as soon as additional data associated with the particular entity is received/generated. Alternatively or additionally, the respective outputs for a particular entity can be re-computed and re-transmitted periodically according to a schedule.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
a central computing system comprising one or more processors and one or more memories, the central computing system configured to perform a first set of operations, the first set of operations comprising:
storing a set of public data, wherein a plurality of subsets of the public data are respectively associated with a plurality of entities; and
for each of the plurality of entities:
processing the respective subset of the public data associated with the entity to produce a respective output for the entity; and
transmitting data descriptive of the respective output for the entity to one or more entity computing devices associated with the entity; and
a plurality of entity computing devices respectively associated with the plurality of entities, wherein at least one of the entity computing devices is configured to perform a second set of operations, the second set of operations comprising:
storing a set of private data that describes one or more connections between a corresponding entity of the plurality of entities and one or more connected entities of the plurality of entities;
receiving the respective output associated with the corresponding entity from the central computing system;
communicating with at least one other entity computing device to receive at least one additional output, wherein the at least one other entity computing device is associated with at least one connected entity of the one or more connected entities, and wherein the at least one additional output is associated with the at least one connected entity; and
determining a combined output based at least in part on a combination of the respective output associated with the corresponding entity with the at least one additional output associated with the at least one connected entity.

2. The computing system of claim 1, wherein:
processing the respective subset of the public data associated with the entity to produce the respective output for the entity comprises performing, by the central computing system, a streaming algorithm on the respective subset of the public data associated with the entity to produce a respective sketch for the entity;
receiving the respective output associated with the corresponding entity from the central computing system comprises receiving the respective sketch associated with the corresponding entity from the central computing system;
communicating with the at least one other entity computing device to receive at least one additional output comprises communicating with the at least one other entity computing device to receive at least one additional sketch that is associated with the at least one connected entity of the one or more connected entities; and
determining the combined output based at least in part on the combination of the respective output associated with the corresponding entity with the at least one additional output associated with the at least one connected entity comprises composing the respective sketch associated with the corresponding entity with the at least one additional sketch associated with the at least one connected entity to obtain a combined sketch.

3. The computing system of claim 1, wherein each set of private data comprises a private graph that describes one or more social connections between the corresponding entity of the plurality of entities and the one or more connected entities of the plurality of entities.

4. The computing system of claim 1, wherein the set of public data comprises a public graph and the respective output comprises a respective result of a graph processing technique performed on the public graph.

5. The computing system of claim 4, wherein the graph processing technique comprises performing:
a uniform recommendation function;
a linear recommendation function;
a heavy hitter function; or
a k-clustering function.

6. The computing system of claim 1, wherein the at least one additional output that is associated with the at least one connected entity of the one or more connected entities was received by the at least one other entity computing device from the central computing system.

7. The computing system of claim 1, wherein the second set of operations further comprises:
communicating with the at least one other entity computing device associated with the at least one connected entity to receive from the at least one other entity computing device an additional set of private data that is private to the at least one entity computing device;
wherein determining the combined output comprises determining the combined output based at least in part on a combination of the respective output associated with the corresponding entity and received from the central computing system with the at least one additional output associated with the at least one connected entity and further based at least in part on the additional set of private data received from the at least one entity computing device.

8. The computing system of claim 1, wherein the second set of operations further comprises:
storing an additional set of private data locally on the at least one entity computing device;

wherein determining the combined output comprises determining the combined output based at least in part on a combination of the respective output associated with the corresponding entity and received from the central computing system with the at least one additional output associated with the at least one connected entity and further based at least in part on the additional set of private data that is stored locally on the at least one entity computing device.

9. The computing system of claim 1, wherein communicating with the at least one other entity computing device to receive the at least one additional output comprises directly communicating with the at least one other entity computing device to directly receive the at least one additional output.

10. The computing system of claim 1, wherein communicating with the at least one other entity computing device to receive the at least one additional output comprises indirectly communicating with the at least one other entity computing device using one or more intermediaries to indirectly receive the at least one additional output, and wherein the at least one additional output is end-to-end encrypted from the at least one other entity computing device to the entity computing device that is performing the second set of operations.

11. A computer-implemented method, the method comprising:
storing, by an entity computing device associated with a corresponding entity of a plurality of entities, a set of private data that describes one or more connections between the corresponding entity and one or more connected entities of the plurality of entities;
receiving, by the entity computing device from a central computing system, a respective output associated with the corresponding entity, wherein the respective output is a result of the central computing system processing a respective subset of a set of public data stored at the central computing system, wherein the respective subset of the set of public data is associated with the corresponding entity;
communicating, by the entity computing device, with at least one other entity computing device to receive at least one additional output, wherein the at least one other entity computing device is associated with at least one connected entity of the one or more connected entities, and wherein the at least one additional output is associated with the at least one connected entity, the at least one additional output having been received by the at least one other entity computing device from the central computing system, wherein the at least one additional output is a result of the central computing system processing at least one additional subset of the set of public data stored at the central computing system, and wherein the at least one additional subset of the set of public data is associated with the at least one connected entity; and
determining, by the entity computing device, a combined output based at least in part on a combination of the respective output associated with the corresponding entity with the at least one additional output associated with the at least one connected entity.

12. The method of claim 11, wherein:
the respective output comprises a respective sketch generated through performance, by the central computing system, of a streaming algorithm on the respective subset of the set of public data associated with the corresponding entity;
the at least one additional output comprises at least one additional sketch generated, by the central computing system, through performance of the streaming algorithm on the at least one additional subset of the set of public data associated with the at least one connected entity; and
determining, by the entity computing device, the combined output comprises composing, by the entity computing device, the respective sketch and the at least one additional sketch.

13. The method of claim 11, wherein the set of private data comprises a private graph that describes one or more social connections between the corresponding entity of the plurality of entities and the one or more connected entities of the plurality of entities.

14. The method of claim 11, wherein the set of public data comprises a public graph and the respective output comprises a respective result of a graph processing technique performed on the public graph.

15. The method of claim 14, wherein the graph processing technique comprises evaluating:
a uniform recommendation function;
a linear recommendation function;
a heavy hitter function; or
a k-clustering function.

16. The method of claim 11, further comprising:
communicating, by the entity computing device, with the at least one other entity computing device associated with the at least one of the one or more connected entities to receive from the at least one other entity computing device an additional set of private data that is private to the at least one entity computing device;
wherein determining, by the entity computing device, the combined output comprises determining, by the entity computing device, the combined output based at least in part on a combination of the respective output associated with the corresponding entity and received from the central computing system with the at least one additional output associated with the at least one connected entity and further based at least in part on the additional set of private data received from the at least one entity computing device.

17. The method of claim 11, further comprising:
storing, by the entity computing device, an additional set of private data locally on the at least one entity computing device;
wherein determining, by the entity computing device, the combined output comprises determining, by the entity computing device, the combined output based at least in part on a combination of the respective output associated with the corresponding entity and received from the central computing system with the at least one additional output associated with the at least one connected entity and further based at least in part on the additional set of private data that is stored locally on the at least one entity computing device.

18. The method of claim 11, wherein communicating, by the entity computing device, with the at least one other entity computing device to receive the at least one additional output that is associated with the at least one connected entity of the one or more connected entities comprises directly communicating, by the entity computing device, with the at least one other entity computing device to directly receive the at least one additional output.

19. The method of claim 11, wherein communicating, by the entity computing device, with the at least one other entity computing device to receive the at least one additional output that is associated with the at least one connected entity of the one or more connected entities comprises indirectly communicating, by the entity computing device, with the at least one other entity computing device using one or more intermediaries to indirectly receive the at least one additional output, and wherein the at least one additional output is end-to-end encrypted from the at least one other entity computing device to the entity computing device.

* * * * *